(No Model.)
W. E. ESPERSON.
CHIMNEY CAP.
No. 542,757. Patented July 16, 1895.
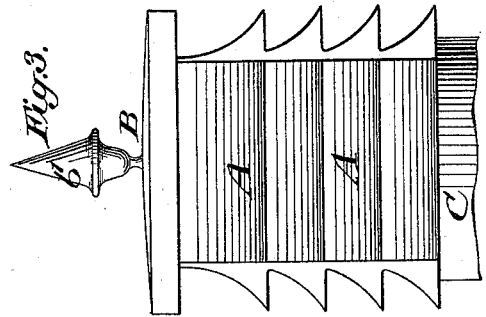
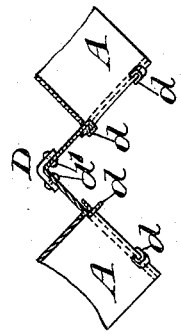
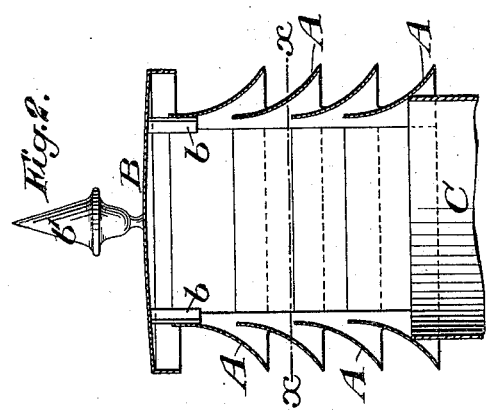
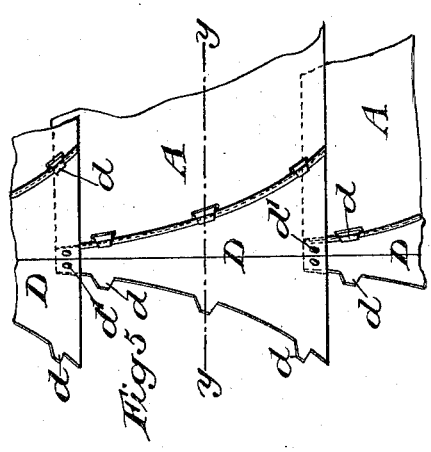
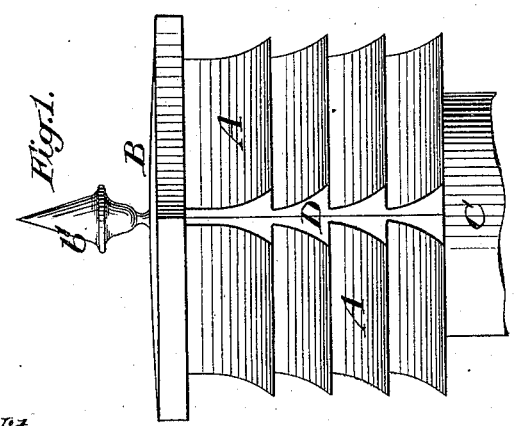
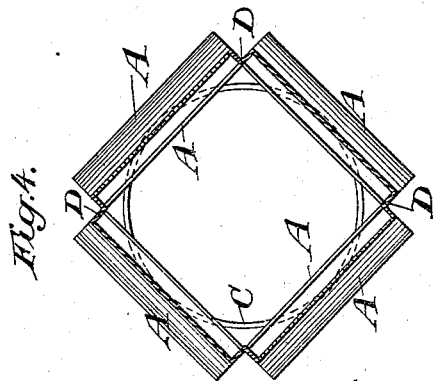
Witnesses:
George Barry,
V. B. Simard.
Inventor:
William E. Esperson
by attorneys
Brown & Seward

UNITED STATES PATENT OFFICE.

WILLIAM E. ESPERSON, OF BROOKLYN, NEW YORK.

CHIMNEY-CAP.

SPECIFICATION forming part of Letters Patent No. 542,757, dated July 16, 1895.

Application filed May 8, 1895. Serial No. 548,480. (No model.)

*To all whom it may concern:*

Be it known that I, WILLIAM E. ESPERSON, of Brooklyn, in the county of Kings and State of New York, have invented a new and useful Improvement in Chimney-Caps, of which the following is a specification.

My invention relates to an improvement in chimney-caps, the object being to provide a chimney-cap which will be very strong and simple in construction, and which will be neat and attractive in appearance.

A practical embodiment of my invention is represented in the accompanying drawings, in which—

Figure 1 is a view of the chimney-cap with one of its corner-plates and the two adjacent series of louver-slats being shown in full lines. Fig. 2 is a vertical central section through the chimney-cap. Fig. 3 is a side view of the chimney-cap, one series of louver-slats and two corner-plates being shown. Fig. 4 is a transverse section on the line $x\,x$ of Fig. 2. Fig. 5 is an enlarged detail view, showing the manner which I prefer to secure the ends of the louver-slats to the corner-plates, and Fig. 6 is a transverse section on the line $y\,y$ of Fig. 5.

The chimney-cap is polygonal in shape, and its body portion is composed of series of superimposed louver-slats, which are connected at their ends by angular upright corner plates or pieces.

In the accompanying drawings I have shown the cap as being rectangular in form.

The louver-slats are denoted by A, and they are preferably of curved form in cross-section. These slats are arranged in series on the four sides of the chimney-cap, the lower edges of the slats being extended down below the top of the next lower slat and spaced therefrom to form suitable openings, through which the wind is directed to form an upward draft in the chimney. Above the top louver-slats I locate a suitable cover B, which is spaced from and secured to the said top louver-slats by means of suitable clips $b$. This cover may be provided with any suitable ornamentation $b'$ or not, as may be desired. To the bottom louver-slats I secure a suitable depending portion C, which is adapted to engage the chimney for mounting the cap thereon. This depending portion C may be made circular, as shown, or any other desired shape for fitting the different styles of chimneys.

The upright angular corner-plates are denoted by D, and they connect the ends of the louver-slats together, and also close the openings between the said ends. The edges of these corner-plates D are notched, one wall of the said notch being horizontal and the other wall being cut in concave form for fitting the louver-slats A.

The manner in which I secure the louver-slats to the corner-plates is as follows: Along each of the concave edges of the corner-plates I provide suitable tongues or lugs $d$, and along each of the ends of the several louver-slats I provide a series of openings or slots through which the tongues or lugs $d$ are inserted. Each of the ends of the louver-slats are then turned over or crimped along the concave edge of the corner-plate, and the tongues $d$ are then bent over, thereby clamping the louver-slats to the corner-plate. Each of these angular corner-plates, instead of being made in a single piece, may be formed in sections, as shown in Figs. 5 and 6. In this case the top of one section of the angular plate is secured to the bottom of the next section above it, preferably by means of suitable rivets $d'$. When the angular corner-plates are formed in sections, as just described, the number of superimposed louver-slats may be varied at pleasure without in any degree disturbing the rest of the chimney-cap.

The chimney-cap as thus constructed can be made very cheaply, is attractive in shape, is very strong, and does away entirely with the necessity of using costly dies for stamping out the different parts.

What I claim is—

1. A chimney cap, the body portion of which consists of series of superimposed louver slats and angular corner plates secured to each of the adjacent ends of the said louver slats for connecting them rigidly together, substantially as set forth.

2. A chimney cap, the body portion of which consists of series of superimposed louver slats and angle plates, each of said angle plates securing the adjacent ends of two series of louver slats together, the said corner plates being composed of sections secured together, substantially as set forth.

3. A chimney cap, the body portion of which consists of series of superimposed louver slats and angle plates, the one being provided with a tongue and the other with a slot engaging said tongue for fastening them securely together, substantially as set forth.

WILLIAM E. ESPERSON.

Witnesses:
 FREDK. HAYNES,
 GEORGE BARRY.